United States Patent [19]

Ohta et al.

[11] Patent Number: 5,490,127
[45] Date of Patent: Feb. 6, 1996

[54] ASYMMETRY DETECTOR FOR USE IN AN OPTICAL RECORDING AND REPRODUCING DEVICE

[75] Inventors: Shinji Ohta, Kanagawa; Hiroyuki Ito, Tokyo, both of Japan

[73] Assignee: Sony Corporation, Tokyo, Japan

[21] Appl. No.: 234,647

[22] Filed: Apr. 28, 1994

[30] Foreign Application Priority Data

May 11, 1993 [JP] Japan ................................ 5-133977

[51] Int. Cl.⁶ ........................................... G11B 7/00
[52] U.S. Cl. .................. 367/116; 369/59; 369/54; 369/32
[58] Field of Search ................ 369/124, 32, 54, 369/116, 53, 59, 44.27

[56] References Cited

U.S. PATENT DOCUMENTS

| | | | |
|---|---|---|---|
| 4,466,089 | 8/1984 | Wachi | 369/32 |
| 5,070,495 | 12/1991 | Bletscher, Jr. et al. | 369/116 |
| 5,216,660 | 6/1993 | Iimura | 369/116 |
| 5,226,027 | 7/1993 | Bakx | 369/54 |
| 5,268,893 | 12/1993 | Call et al. | 369/116 |
| 5,353,270 | 10/1994 | Iimura | 369/116 |

FOREIGN PATENT DOCUMENTS

| | | |
|---|---|---|
| 0446892A3 | 9/1991 | European Pat. Off. . |
| 0453161A2 | 10/1991 | European Pat. Off. . |
| 0644565 | 2/1994 | Japan . |
| 6150578 | 5/1994 | Japan . |

OTHER PUBLICATIONS

Patent Abstracts Of Japan, vol. 14, No. 230 (P–1048), 16 May 1990 of JP–A–20 54 424 (Nippon Columbia), 23 Feb. 1990.

U.S. Pat. application Ser. No. 07/980,488 Timura filed on Nov. 23, 1992.

Primary Examiner—Georgia Y. Epps
Assistant Examiner—Tan Dinh
Attorney, Agent, or Firm—Limbach & Limbach

[57] ABSTRACT

This invention relates to an optical disc apparatus and the evaluating method of the optical disc apparatus, which emits the light beam to the disc typed recording medium to sequentially form pits and records the desired data, and the asymmetry, etc. can be detected rapidly and surely. The peak value and the bottom value of the reproduced signal are sequentially held to detect the minimum value and the maximum value of the held result, and then the recording system, the characteristics of the disc typed recording medium, or the reproducing system can be evaluated based on the detected result.

6 Claims, 9 Drawing Sheets

0V LEVEL

PEAK HOLD  SAMPLE HOLD  CLEAR  PEAK HOLD

3T TOP    11T TOP

11T TOP    3T TOP

3T TOP
0V LEVEL

ASYMMETRY DETECTOR FOR USE IN AN OPTICAL RECORDING AND REPRODUCING DEVICE

BACKGROUND OF THE INVENTION

1. Field of the Invention

This invention relates to an optical disc apparatus, and more particularly, to a write once type optical disc apparatus in which a laser beam is emitted onto an optical disc to sequentially form pits, thereby recording desired data.

2. Description of the Related Art

Heretofore, an optical disc apparatus has been proposed in which a light beam is emitted onto a disc type recording medium to form pits sequentially thereby recording desired information. A CD-R (CD-Recordable) drive based upon the CD (Compact Disc) Standard has been produced as this type of an optical disc apparatus.

The optical disc of this kind consists of a polycarbonate substrate (PC Substrate), a spin-coated organic pigment recording layer (Dye Recording Layer), a reflection layer of deposited gold vapor (Reflection Layer), and a plastic protective layer (Protective Layer).

As shown in FIGS. 1A to 1D, the optical disc apparatus generates such a modulated signal S1 (FIG. 1A) so that the generation probabilities of logic "0" and "1" become equal, by performing EFM (Eight to Fourteen Modulation) on a recording data. A laser diode is driven on the basis of this modulated signal S1. Therefore, in the optical disc apparatus, a light beam is emitted onto the optical disc intermittently corresponding to the logic level of the modulated signal S1, and the organic coloring matter of the data recording plane is altered by heat. Thereby, the area having the low reflection rate, that is, the pits, are formed on the data recording plane. In addition, the light beam emitted from a laser is high for recording.

The optical disc apparatus generates the modulated signal S1 so that H level and L level continue within a cycle 3T to 11T based on the predetermined reference cycle T. Thus, the optical disc apparatus records the desired data by sequentially forming pits P on the data recording plane (FIG. 1B). In addition, the portions where pits P are not formed are called "lands".

In reproducing, the light beam of low output is emitted for reproducing, and receives the reflected light from the optical disc at a photo detector. Thus, the optical disc apparatus obtains the reproduced signal RF the level of which changes depending on the intensity of the reflected light (FIG. 1C). Then, the signal level of the reproduced signal RF is detected based on the predetermined slice level SL, thereby detecting the reproduced data D1 (FIG. 1D).

At this time, since the recording signal S1 consists of such recording signals that the generation probabilities of the logic "0" and "1" by EFM are equal, the optical disc apparatus selects and sets the slice level SL so that the generation probabilities of logic "0" and "1" become equal even in the reproduced data D1. Thus, the bit error rate is reduced.

On the contrary, in recording, since the organic coloring matter are heat-altered to form pits, the size of the pits change depending upon the surrounding temperature, the sensitivity of the organic coloring matter, and the wave length of the laser, even when the laser diode is driven under the same conditions. Therefore, the optical disc system changes the driving power of the laser diode one after another and records the test data in the predetermined test writing area in the optical disc, and thereafter reproduces the test data to detect a plurality of asymmetry values Asy. Then, the optical disc apparatus selects the asymmetry value Asy, which is the closest value to the predetermined asymmetry value, among the detected asymmetry values, and selects the driving power at the time as an optimum value. The laser diode is driven by the selected driving power and the desired data is recorded. Therefore, the optical disc apparatus constantly forms pits having fixed size and reduces jitter of the reproduced signal, etc.

Here, the asymmetry value signifies the ratio of time means of pits and lands, and is expressed by the relation formula, using the slice level SL at which the generation probabilities of the logic "0" and "1" become equal in the reproduced data D1, a peak level TOP of the reproduced signal, and a bottom level BTM of the reproduced signal.

For this reason, the optical disc apparatus, in test writing, the asymmetry value Asy is simply detected by using an asymmetry detecting circuit 1 shown in FIG. 2.

That is, the optical disc apparatus reproduces the test data recorded in the test writing area, and inputs the reproduced signal RF obtained as the result to the asymmetry detecting circuit 1.

The reproduced signal RF is supplied to a clamp circuit 3, after the direct current component is removed at an input capacitor 2. Thereby, as shown in FIG. 3, the bottom level of the reproduced signal RF is held to "0" level. A comparator circuit 4 compares the slice level SL with the output signal of the clamp circuit 3 and supplies inverting output and non-inverting output, which are the compared result, to low pass filter circuits 5 and 6. The low pass filter circuits 5 and 6 convert the output of the comparator circuit 4 into direct current signals respectively, to supply to a differential amplifier 7.

The differential amplifier 7 inputs the output signal of the low pass filter circuits 5 and 6 to amplify the differential components. The output signal of the differential amplifier 7 is fed back to the input terminal of the comparator circuit 4 as the slice level SL.

In this way, the asymmetry detecting circuit 1 sets the slice level SL so that the generation probabilities of the logic "0" and "1" become equal.

A peak hold circuit 8 peak holds the output signal of the clamp circuit 3 and detects the signal level (A+B) between the bottom level BTM and the peak level TOP of the reproduced signal RF.

The output signal and the slice level SL of the peak hold circuit 8 are converted into digital values at analog/digital converting circuits (A/D) 9 and 10 to supply to a system control circuit (not shown). The system control circuit performs the calculating process which is indicated by the formula:

$$Asy = \frac{B - A}{2(A + B)} \tag{1}$$

on each driving power, and detects the asymmetry value Asy.

Then, the system control circuit selects the asymmetry value, which is the closest value to the predetermined asymmetry value, among the detected asymmetry values, and selects the driving power of the laser at the time when the selected asymmetry value is obtained as the optimum value. Then, the following data are written with the selected driving power of the laser. Therefore, since the laser driving power in writing is set to the optimum value, the bit error rate is improved by reducing the jitter in reproducing.

The test writing area is formed in the inner side of the optical disc, and the size of test writing area is limited to a specific size. Here, according to the conventional system, the slice level SL is obtained by using the low pass filter circuit.

Hence, it is necessary to enlarge the time constant of the low pass filter circuit to some size, and the response is slow, thereby taking much time until the slice level is stable to a fixed DC level. Therefore, the time to perform a test writing by each laser power becomes long, and much test writing area is used as a result. Here, because this optical disc is the write once type, the area in which a test writing is performed once can not be used for a second test writing. Therefore, if it takes much time to perform one test writing, the number of times to perform a test writing is reduced. That is, this means that the number of times to write a desired data reduces. To solve this problem, it can be considered to reduce the number of times to change the laser power in one test writing, but this needs to select the optimum asymmetry value from the detected result of few asymmetry values. That is, there is a problem that the optimum asymmetry value may not be detected and the writing is performed by the laser power determined by non-optimum asymmetry.

SUMMARY OF THE INVENTION

In view of the foregoing, an object of this invention is to provide an optical disc apparatus. More specifically, this invention relates to an optical disc apparatus for recording an information signal to an optical disc. The information signal is converted into binary recording data that the generation probabilities of logic "1" and the logic "0" are equal. An object of this invention is to provide an optical disc apparatus having an optical pickup having a light emitting device for emitting a light onto an optical disc and a photo detector receiving the light reflected from said optical disc and generating an electric signal responsive to the received light. A reproduced signal is produced based on the electric signal; a driving mechanism drives the optical pickup to control drive power of said light emitting device. An asymmetry detect circuit includes a local level detect means for detecting the local maximum value and the local minimum value of the reproduced signal, a first minimum value detecting means for detecting the minimum value of said local maximum value, a first maximum value detecting means for detecting the maximum value of said local minimum value, a second maximum value detecting means for detecting the maximum value of said reproduced signal, a second minimum value detecting means for detecting the minimum value of said reproduced signal, an asymmetry value detecting means for detecting the asymmetry value from the minimum value of said local maximum value, the maximum value of said local minimum value, the maximum value of said reproduced signal, and the minimum value of said reproduced signal. A control means is provided for controlling said light emitting device so as to sequentially write test data in the predetermined area of said optical disc by the different driving power, and for determining the appropriate driving power when the desired data is recorded in said optical disc, based on a plurality of asymmetry values by said each driving power detected by said asymmetry detecting means.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 1A:
FIGS. 1A to 1D are signal waveform charts for the explanation of the principle of the operation of the optical disc apparatus.
Figure 1B:
Figure 1C:
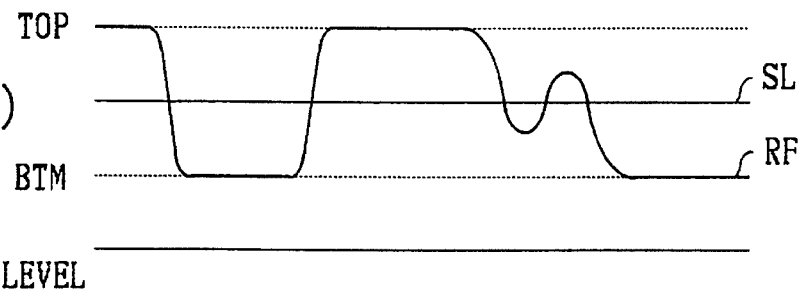
Figure 1D:
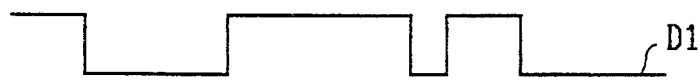
Figure 2:
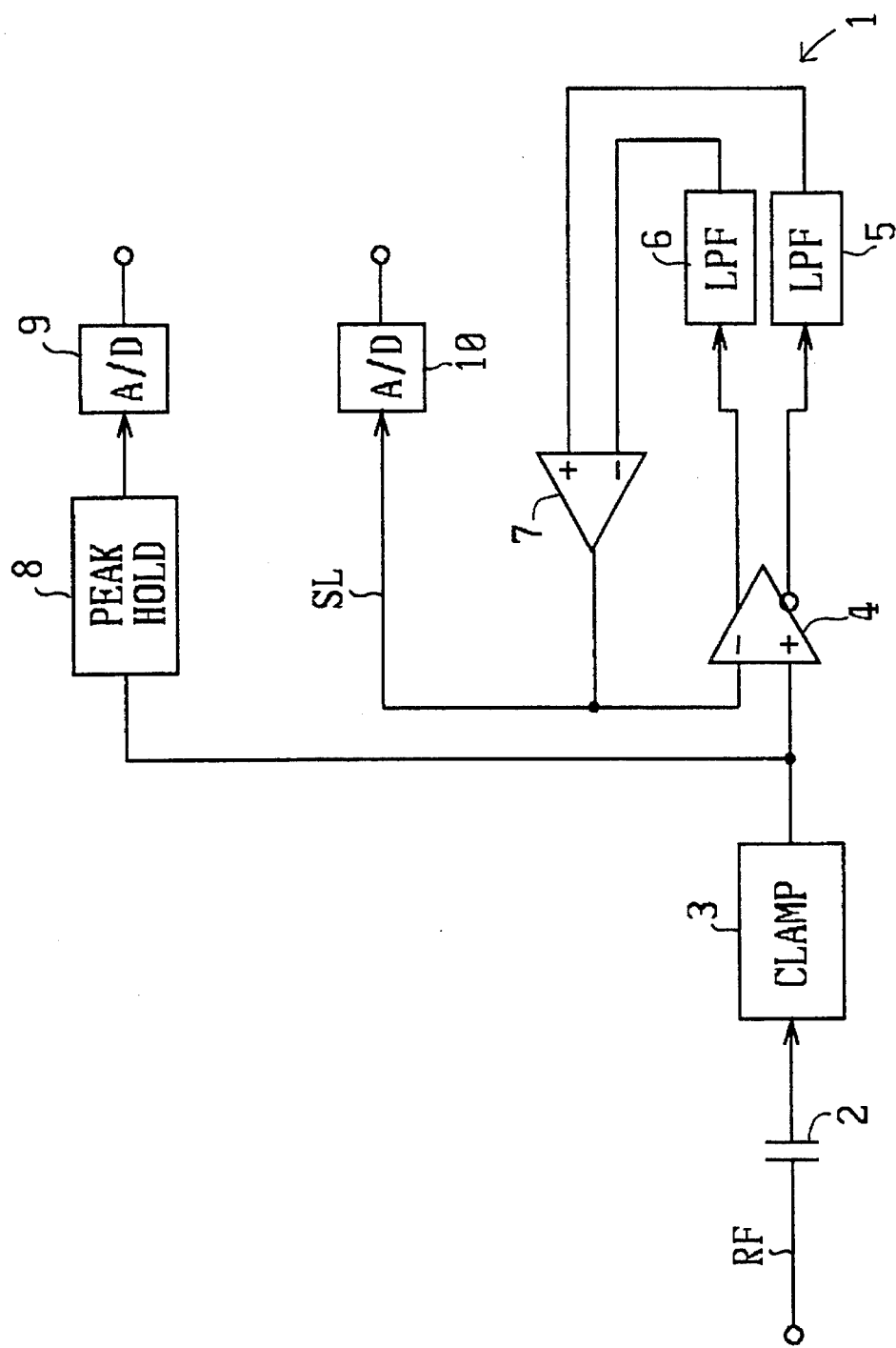
FIG. 2 is a block diagram showing a conventional asymmetry detecting circuit.
Figure 3:
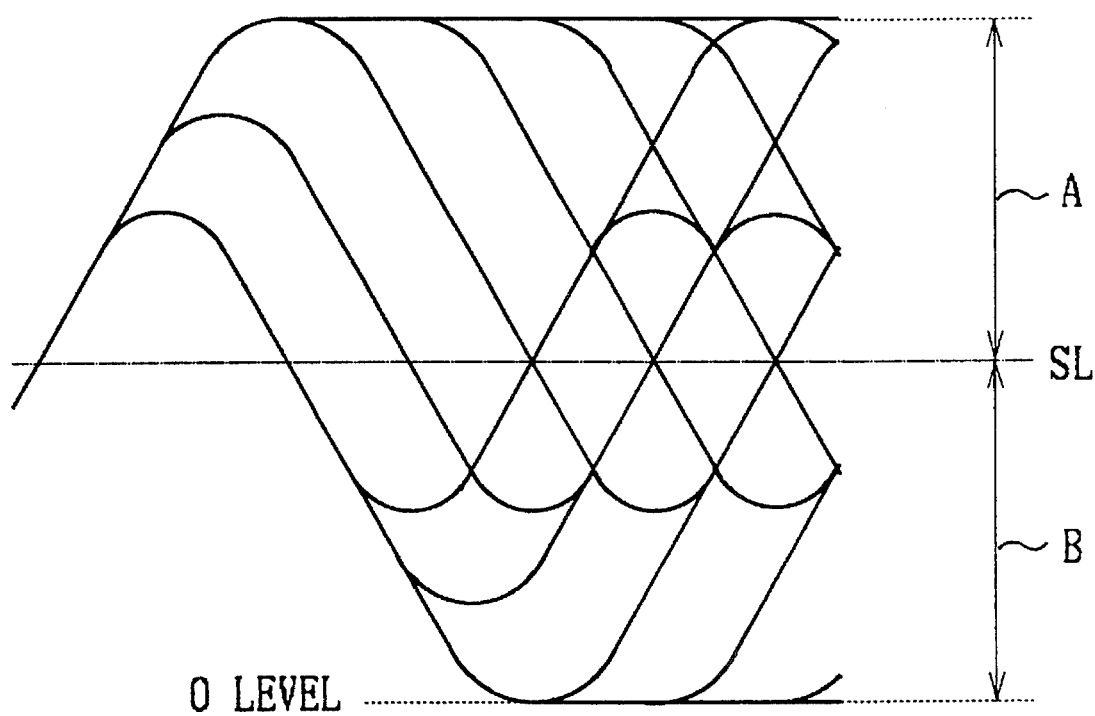
FIG. 3 is a signal waveform chart for the explanation of the operation thereof.
Figure 4:
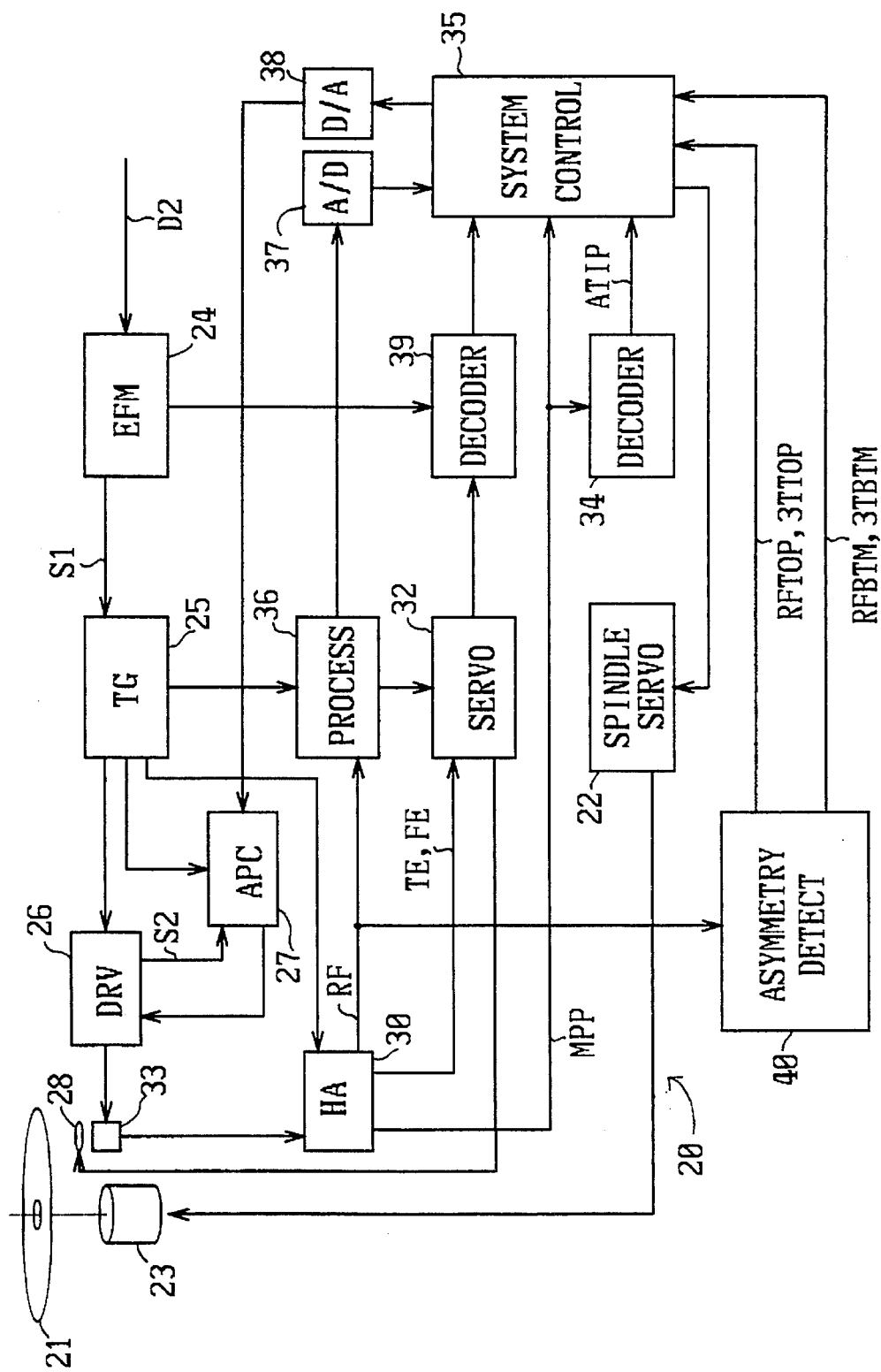
FIG. 4 is a block diagram showing an optical disc apparatus according to a first, preferred embodiment of this invention.

Preferred embodiments of this invention will be described with reference to the accompanying drawings:

In FIG. 4, an optical disc apparatus 20 which can record the desired data in the optical disc is shown.

That is, an optical disc 21 is a disc type recording medium in which data recording plane is formed with organic coloring matter. The optical disc 21 is driven by a spindle motor 23 controlled by a spindle servo circuit 22 so as to rotate the optical disc 21 under a constant linear velocity.

In this condition, the optical disc apparatus 20, in recording, inputs the recording data D2 to an EFM modulating circuit 24, and the recording data D2 are EFM modulated. A timing generator 25 corrects the timing of the modulated signal S1 outputted from the EFM modulating circuit 24 and applies it to a laser driver 26. The laser driver 26 drives a laser diode provided in an optical pickup 33, based on the modulated signal S1.

The laser driver 26 is controlled by an automatic power control circuit 27 based on laser driving information S2 from the laser driver 26. Thereby, in recording and reproducing, the intensity of a light beam emitted from the laser diode is held to a specified value.

Hence, the optical disc apparatus 20 condenses the light beam of the laser diode to the optical disc 21 with an object lens 28, and in recording, sequentially forms pits corresponding to the modulated signal S1.

Further, the photo detector provided in the optical pickup 33 receives the reflected light, which is obtained by emitting the light beam onto the optical disc 21, to convert the light into an electric signal. A head amplifier 30 amplifies the output signal of the receiving element to output it. At this time, the head amplifier 30 performs the process of adding, subtracting, etc. on the output signal of each photo detector formed by four-division, and generates a focus error signal FE and a tracking error signal TE. A servo circuit 32 moves the object lens 28 up and down, and right and left, based on the focus error signal FE and the tracking error signal TE.

In this way, the optical disc apparatus 20 provides tracking controls and focus controls, based on the received result of reflected light. Although there are no pits in an unrecorded optical disc, there is a guide line called the "pre-groove". This guide line controls the tracking servo during recording. The pre-groove wobbles slightly, and the carrier frequency of this wobble is FM modulated, corresponding to a time code called ATIP (Absolute Time In Pre-groove), which indicates an absolute address (equivalent to the subcode Q channel of a Compact Disc) on the disc. This code is used to control the spindle servo during recording, and to manage the recording address.

That is, the head amplifier 30 detects the wobble information MPP of this pre-groove from the output signal of the photo detector to supply it to a system control circuit 35. The system control circuit 35 controls the spindle servo circuit 22 based on the frequency of the wobble information MPP so as to drive the optical disc 21 to rotate under CLV (Constant Linear Velocity).

A decoder circuit 34 detects a position data ATIP of the light beam emitting position from the wobble information MPP to output it to the system control circuit 35. The system control circuit 35 controls the operation of the whole system on the basis of the position data ATIP, and sequentially records the data in a predetermined area.

Further, the head amplifier 30 amplifies the output signal of the photo detector, and generates the reproduced signal RF the signal level of which changes depending on the intensity of reflected light. A process circuit 36 binarizes the reproduced signal RF, and in reproducing, outputs the reproduced data. Therefore, the optical disc apparatus 20, in reproducing, processes the output signal of the process circuit 36 at a signal processing circuit (not shown) so that the data recorded in the optical disc 21 can be reproduced.

Further, an asymmetry detecting circuit 40 detects the asymmetry value from the reproduced signal RF of the test data recorded in the test writing area. First, the system control circuit 35 supplies the power control signal to the automatic power control circuit 27 via the digital/analog converting circuit 38. The power control signal has a different value in recording and in reproducing, thereby driving a laser by power for recording and reproducing.

Further, when the recording command is supplied, the asymmetry value is detected before the desired data is recorded.

More specifically, when the recording command is supplied, the system control circuit 35 records the test data in the test writing area of the optical disc before the desired data is recorded. At this time, the system control circuit 35 changes the level of power control data sequentially so that the test data is test written in the optical disc by a plurality of different laser powers. Then, the level of power control signal is changed to the level for reproducing and the test data with which the test writing is performed is reproduced.

Here, the test data consists of the recording signals having pulse length 3T to 11T. The optimum asymmetry value is previously determined from the error rate of the data in each asymmetry value. Here, the optimum asymmetry value is set to, for example, "0". The asymmetry detecting circuit 40 changes the laser driving power stepwise to detect the asymmetry value by each laser power respectively, on the basis of this test data. Then, the system control circuit 35 makes a graph shown by the laser driving power—the asymmetry value from the detected asymmetry value, and obtains the laser power in the optimum asymmetry value set previously, that is, the asymmetry value "0", from this graph.

Also, the asymmetry value which is the closest asymmetry value to "0" can be selected from the detected each asymmetry value so as to select the laser driving power in that case. Then, the power control data when the optimum asymmetry value is obtained, is set as the power control data in recording. A decoder 39 error correct processes the subcode from the decoded result to supply to the system control circuit 35.

Figure 5:
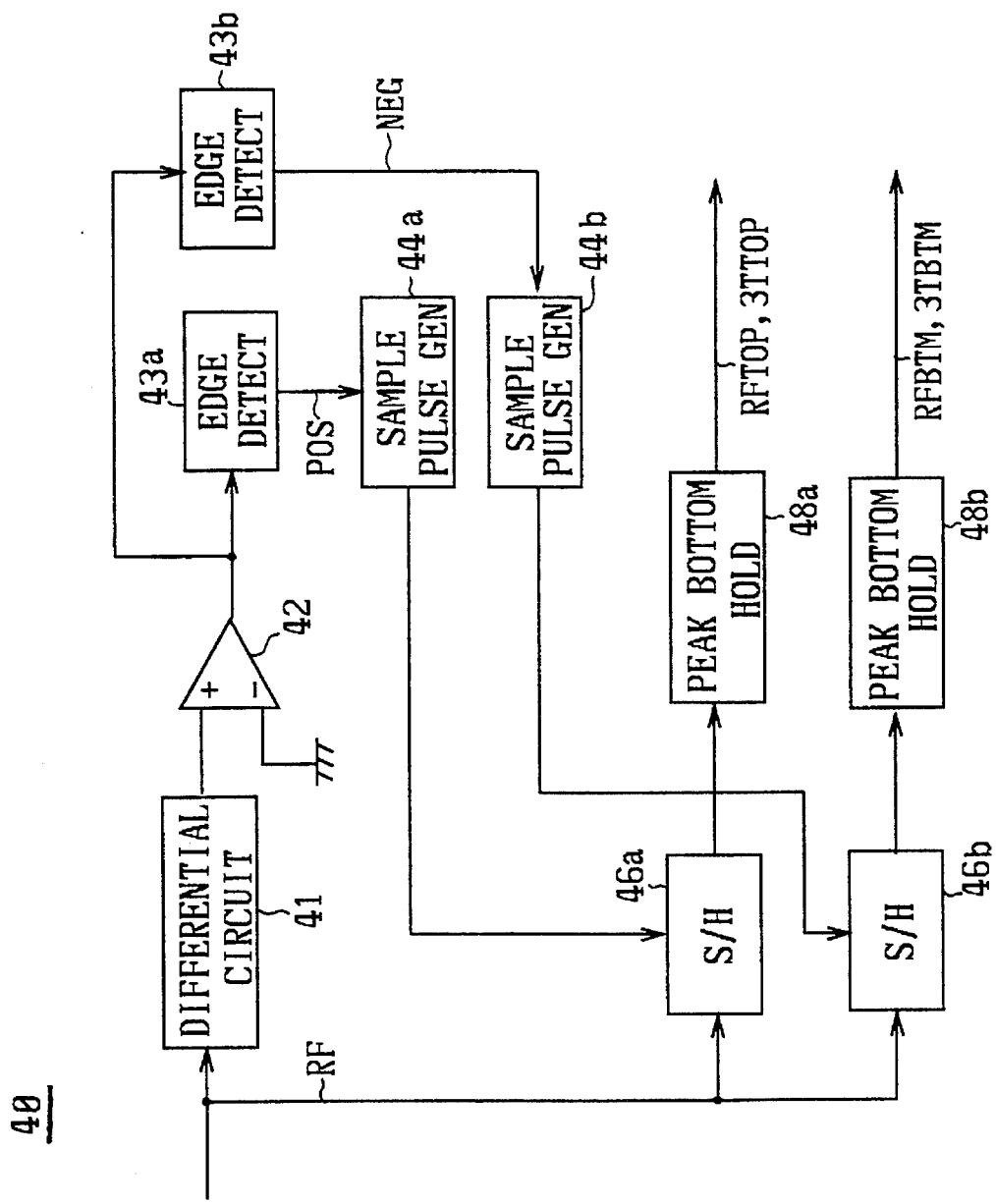
FIG. 5 is a block diagram showing the asymmetry detecting circuit thereof.

As shown in FIG. 5, in the asymmetry detecting circuit 40, a differential circuit 41 generates the differential signal the signal level of which crosses the "0" level or the timing when the reproduced signal RF reaches peak level or a bottom level.

The comparator circuit 42 detects the signal level of the differential signal on the basis of the "0" level and generates the comparison signal the signal level of which is changed at the timing when the differential signal crosses the "0" level. Edge detecting circuits 43a and 43b output edge detecting signals POS and NEG the signal level of which rises up respectively in the falling edge and the rising edge of the comparison signal and the signal level falls down after the predetermined period. Sampling pulse generating circuits 44a and 44b respectively, generate first and second sampling pulses at the time when the edge detecting signals POS and NEG rise up. The first and second sampling pulses are supplied to sampling hold circuits 46a and 46b, respectively.

The sampling hold circuits 46a and 46b sample and hold the reproduced signal RF based on the first and the second sampling pulses respectively.

Figure 6:
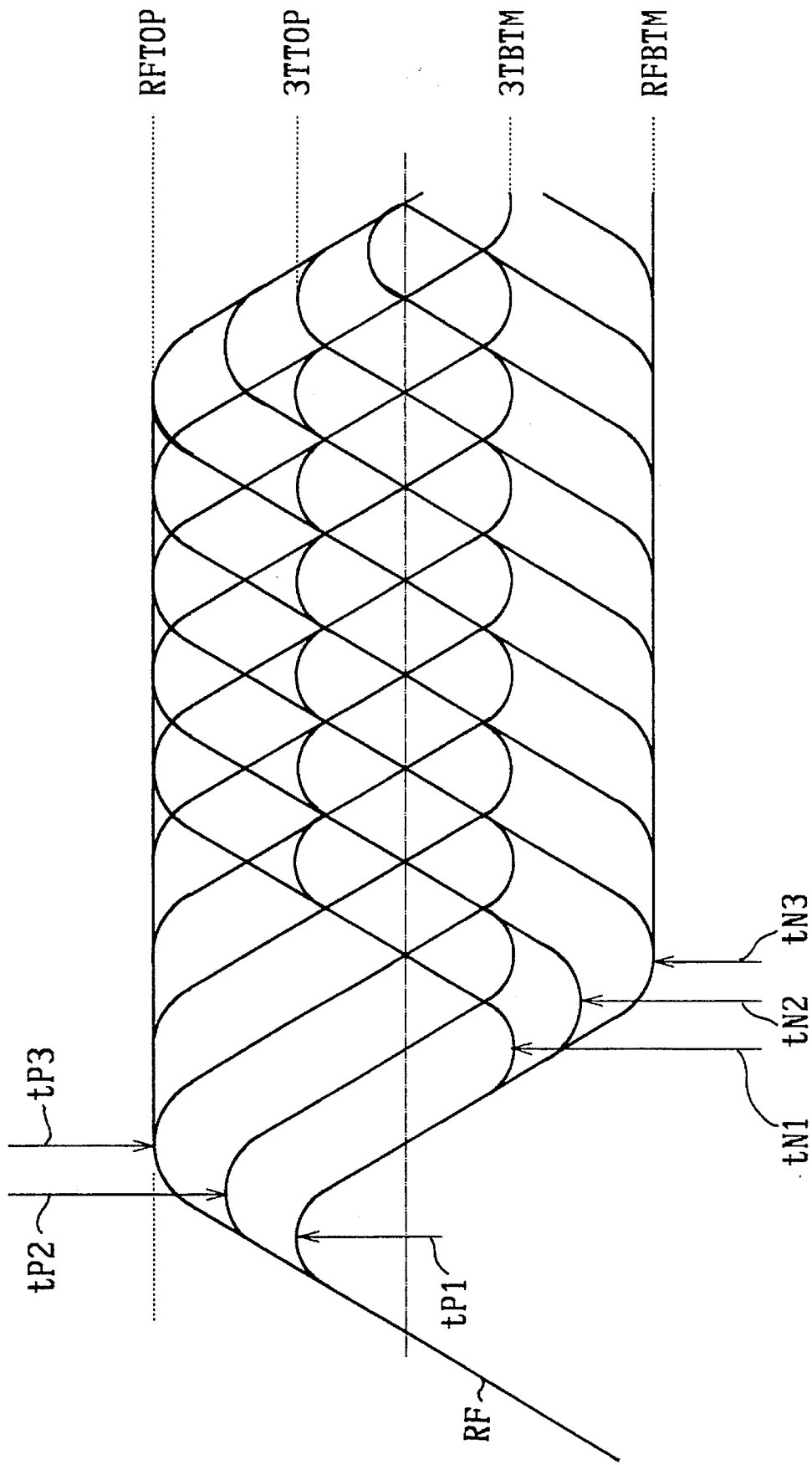
FIG. 6 is a signal waveform chart for the explanation of the operation thereof.

Hence, as shown in FIG. 6, the sample hold circuit 46a samples sequentially the signal level of the reproduced signal RF, at the times tP1, tP2, tP3, . . . when the signal level of the reproduced signal is the peak level. On the contrary, the sample hold circuit 46b samples sequentially the signal level of the reproduced signal RF, at the timing tN1, tN2, tN3, . . . when the signal level of the reproduced signal is the bottom level.

A peak bottom hold circuit 48a holds the peak value and the bottom value of the sampling value of the sample hold circuit 46a, to detect the peak level RFTOP of the reproduced signal RF obtained by reproducing the lands of the pulse length 11T and the peak level 3TTOP of the reproduced signal RF obtained by reproducing the lands of the pulse length 3T, and then supplies them to the system control circuit 35.

A peak bottom hold circuit 48b holds the peak value and the bottom value of the sampling value of the sample hold circuit 46b, to detect the bottom level RFBTM of the reproduced signal RF obtained by reproducing the lands of the pulse length 11T and the bottom level 3TBTM of the reproduced signal RF obtained by reproducing the lands of the pulse length 3T, and then supplies them to the system control circuit 35.

In this way, the system control circuit 35 performs the calculating process of the formula:

$$Asy = \frac{3TTOP + 3TBTM - (RFTOP + RFBTM)}{2(RFTOP - RFBTM)} \qquad (2)$$

and detects the asymmetry value Asy.

Here, the optical disc 21, since the generation probabilities of pits and lands having pulse length 3T makes up a third of the whole, regards the value that the peak level 3TTOP and the bottom level 3TBTM having the pulse length 3T are added in level, which is twice the size of the slice level SL that the generation probabilities of the logic "0" and "1" become equal.

Therefore, by performing the calculating process of the formula (2) corresponding to the formula (1), the asymmetry value Asy can be detected simply.

That is, in this invention, after the peak level and the bottom level are sequentially sampled, the minimum value and the maximum value of each sampling result are detected, so as to detect the peak level 3TTOP and the bottom level 3TBTM having the pulse length 3T, and the peak level RFTOP and the bottom level RFBTM having pulse width 11T, thereby detecting the asymmetry value Asy with a shorter time as compared with the related art. Therefore, the laser driving power in recording can be set in the smaller test writing area.

Therefore, in this invention, the data recording plane of the optical disc 21 is effectively utilized so as to increase the size to record.

The limited test writing area is effectively utilized and the intensity of light is set so that the number of times of additional writing in the non-recorded area can be increased as compared with the related art.

Figure 7:
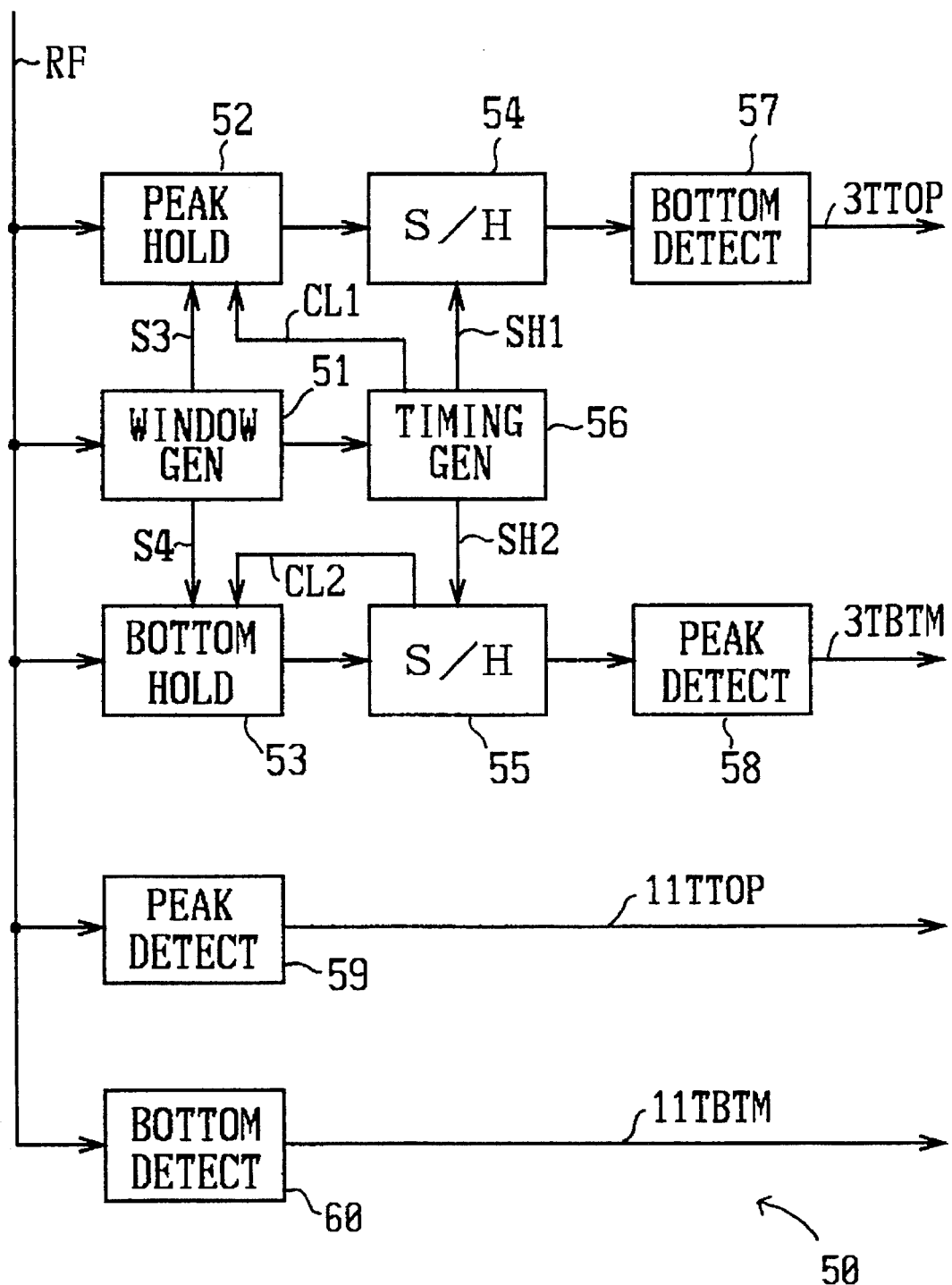
FIG. 7 is a block diagram showing the asymmetry detecting circuit according to a second embodiment.

In FIG. 7, an asymmetry detecting circuit 50 according to another embodiment of this invention.

Figure 8A:
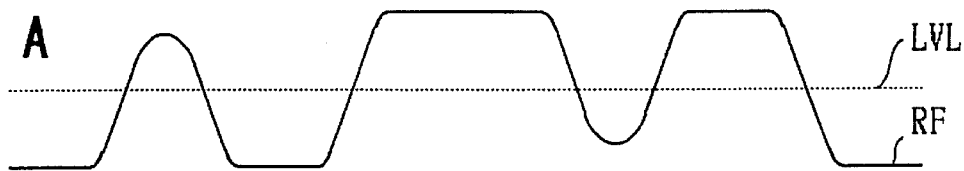
FIGS. 8A to 8H are signal waveform charts for the explanation of the operation of the respective parts thereof.
Figure 8B:
Figure 8C:

A window generating circuit 51 compares the predetermined reference level LVL with the level of the reproduced signal RF (FIG. 8A) and obtains the comparison signal CMP (FIG. 8B), and makes a half round of the comparison signal CMP based on the rising edge of the comparison signal CMP. Thus, the window generating circuit 51 generates the window signal S3 (FIG. 8C).

Figure 8D:
Figure 8E:
Figure 8F:

The window generating circuit 51 makes a half round of the comparison signal CMP based on the falling edge of the comparison signal CMP, so as to generate the window signal S4 (FIG. 8F).

A peak hold circuit 52 and a bottom hold circuit 53 peak holds and bottom holds the signal level of the reproduced signal RF during the period when the signal level of the window signals S3 and S4 become high respectively.

Figure 8G:
Figure 8H:

Sample hold circuits 54 and 55 sample hold the held result at the peak hold circuit 52 and the bottom hold circuit 53, respectively. A timing generating circuit 56 generates the sampling pulses SH1 and SH2 (FIGS. 8D and 8G) in the sample hold circuits 54 and 55, and the clear signals CL1 and CL2 (FIGS. 8E and 8H) in the peak hold circuit 52 and the bottom hold circuit 53, based on the comparison signal CMP and the window signals S3 and S4.

Figure 9A:
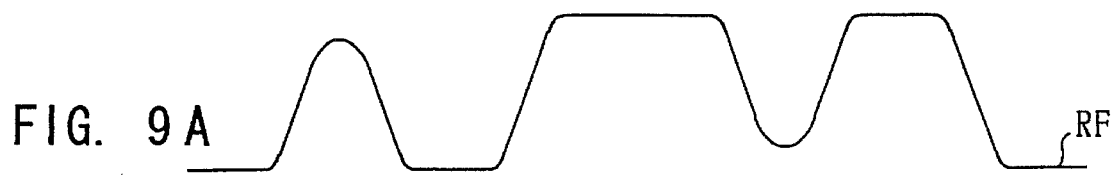
FIGS. 9A to 9E are signal waveform charts for the explanation of the whole operation thereof.
Figure 9B:
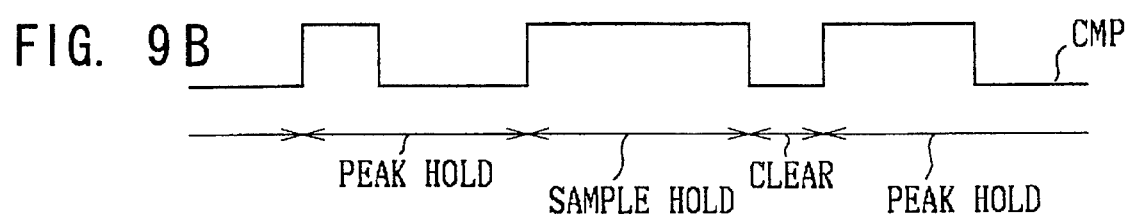

Hereinafter, the method for detecting 3TTOP will be described in accordance with FIGS. 9A to 9E. FIG. 9A shows the RF signal and FIG. 9B shows the comparison signal CMP, and respectively correspond to FIGS. 8A and 8B. In this embodiment, the comparison signal CMP is generated at the window generating circuit 51.

Figure 9C:
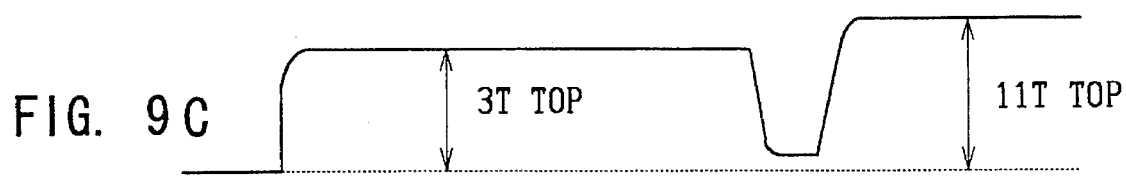
Figure 9D:
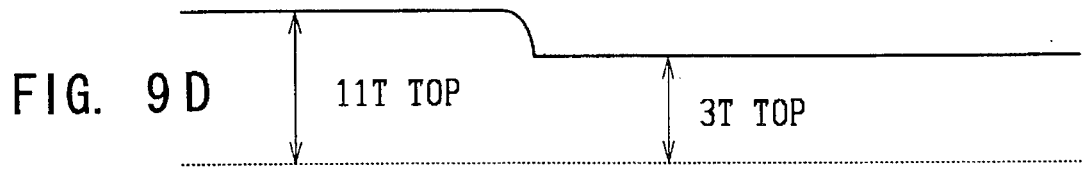
Figure 9E:
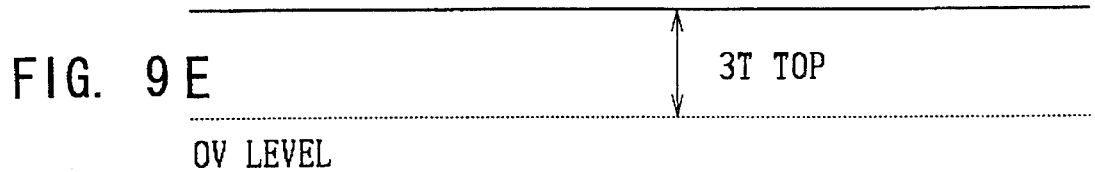

FIG. 9C shows the output signal of the peak hold circuit 52. The peak hold circuit 52 peak holds the reproduced signal RF during the period expressed by "PEAK HOLD" in the figure. The sample hold circuit 54 sample holds the output signal of the peak hold circuit 52 during the period expressed by "SAMPLE HOLD". Then, the clear signal CL1 is supplied to the peak hold circuit 52 during the period expressed by "CLEAR", and the peak value which is held is cleared. FIG. 9D shows the output signal of the sample hold circuit 54, and the sample pulse SH1 is supplied to the sample hold circuit 54 during the period expressed by "SAMPLE HOLD" in FIG. 9B described above, and the output signal of the peak hold circuit 52 shown in FIG. 9C is sample held. FIG. 9E shows the output signal of a bottom detecting circuit 57, and the bottom value of the output signal of the sample hold circuit 54, that is, the value of 3TTOP is detected to supply to the system control circuit 35.

Also, the 3TBTM can be detected by the bottom hold circuit 53, the sample hold circuit 55 and a peak detecting circuit 58 in accordance with the same method described above.

Further, a peak detecting circuit 59 detects the peak level of the reproduced signal RF, that is 11TTOP, to supply to the system control circuit 35. Moreover, a bottom detecting circuit 60 detects the bottom level of the reproduced signal RF, that is 11TBTM, to supply to the system control circuit 35.

The system control circuit 35 detects the asymmetry value in the same way as the first embodiment.

In this way, even in the case where the peak level 3TTOP and the bottom level 3TBTM having the pulse length 3T are detected based on the window signal, the same effects as the first embodiment can be obtained.

Note that the embodiments discussed above have dealt with the case where this invention is applied to the detection of the asymmetry value. However, the present invention is not limited to this, but is widely applicable to the recording and reproducing system of the optical disc and moreover to the characteristics evaluating of the optical disc.

For example, in the optical disc apparatus, the modulation expressed by the formula:

$$I_{top} = RFTOP \qquad (3)$$
$$I11 = RFTOP - RFBTM$$
$$I3 = 3TTOP - 3TBTM$$

$$\text{The modulation of } 11T = \frac{I11}{I_{top}} = \frac{RFTOP - PFBTM}{RFTOP}$$

$$\text{The modulation of } 3T = \frac{I3}{I_{top}} = \frac{3TTOP - 3TBTM}{RFTOP}$$

is important. More specifically, the larger the modulation shown in FIG. 6, the more the characteristics excel. Therefore, the modulation is detected by using the formula (3) from 3TBTM, 3TTOP, TBTM, and 11TTOP obtained by the above embodiment, so that the optical disc apparatus can be evaluated in a short time.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An optical disc apparatus for recording to an optical disc an information signal converted into binary recording data so that generation probabilities of logic "1" and logic "0" are equal, the optical disc apparatus comprising:

optical pickup means having a light emitting device for emitting a light onto an optical disc, the optical pickup means also having a photo detector for receiving light reflected from said optical disc to generate an electric signal responsive to the light reflected from the optical disc;

means for generating a reproduced signal using said electric signal, the reproduced signal having a plurality of local maximum values and a plurality of local minimum values;

driving means for driving said optical pickup means for controlling a drive power of said light emitting device;

an asymmetry detect circuit including, local level detect means for detecting each of the plurality of local maximum values and each of the plurality of local minimum values of said reproduced signal, first minimum value detecting means for detecting a minimum value among the plurality of local maximum values, first maximum value detecting means for detecting a maximum value among the plurality of local minimum values, second maximum value detecting means for detecting a second maximum value of the reproduced signal, second minimum value detecting means for detecting a second minimum value of the reproduced signal; and asymmetry value calculating means for calculating an asymmetry value using the minimum value of said plurality of local maximum values, the maximum value of said plurality of local minimum values, the second maximum value of said reproduced signal, and the second minimum value of said reproduced signal; and control means for controlling said light emitting device to sequentially write a test data in a predetermined area of said optical disc by a number of different driving powers, and for determining an optimum driving power when desired data is recorded on said optical disc, based on a plurality of asymmetry values for said number of different driving powers to be calculated by said asymmetry calculating means.

2. The optical disc apparatus according to claim 1, wherein;

said asymmetry value calculating means calculates an asymmetry value Asy using the following formula:

$$Asy=(3TTOP+3TBTM-(RFTOP+RFBTM))/2(RFTOP-RFBTM)$$

by denoting the minimum value of said plurality of local maximum values by 3TTOP, the maximum value of said plurality of local minimum values by 3TBTM, the second maximum value of said reproduced signal by RFTOP, and the second minimum value of said reproduced signal by RFBTM.

3. The optical disc apparatus according to claim is wherein:

said local level detect means includes a differential circuit for differentiating said reproduced signal, a comparator circuit for comparing an output signal of said differential circuit with a predetermined reference level, edge detecting circuits for detecting a rising edge and a falling edge from an output signal of said comparator circuit, and sample hold circuits for sampling said reproduced signal based on an output signal of said edge detecting circuit.

4. The optical disc apparatus according to claim 1, wherein:

said local level detect means includes a window signal generating circuit for generating first and second window signals based on said reproduced signal, a peak hold circuit for peak holding said reproduced signal based on said first window signal, a bottom hold circuit for bottom holding said reproduced signal based on said second window signal, a bottom detecting circuit for detecting a minimum value of an output signal of said peak hold circuit, and a peak detecting circuit for detecting a maximum value of an output signal of said bottom hold circuit.

5. An asymmetry detecting method in an optical disc apparatus for recording onto an optical disc an information signal converted into binary recording data so that probabilities of logic "1" and logic "0" are equals comprising the steps of:

recording binary recording data onto an optical disc with a selected laser power;

reading the binary recording data recorded on said optical disc to generate a reproduced signal, the reproduced signal having a plurality of local maximum levels and a plurality of local minimum levels;

holding each of the plurality of local maximum levels of said reproduced signal;

detecting a minimum local maximum level from the plurality of local maximum levels;

holding each of the plurality of local minimum levels of said reproduced signal;

detecting a maximum local minimum level from the plurality of local minimum levels;

detecting a second maximum level of said reproduced signal;

detecting a second minimum level of said reproduced signal; and obtaining an asymmetry level by a following function:

$$Asy=3TTOP+3TBTM-(RFTOP+RFBTM)/2(RFTOP-RFBTM)$$

wherein Asy is the asymmetry level, 3TTOP is the minimum local maximum level, 3TBTM is the maximum local minimum level, RFTOP is the second maximum level of said reproduced signal and RFBTM is the second minimum level of said reproduced signal.

6. An evaluating method of an optical disc apparatus, comprising the steps of:

recording binary recording data to an optical disc with a selected laser power;

reading the binary recording data recorded on said optical disc to generate a reproduced signal, the reproduced signal including a plurality of local maximum levels and a plurality of local minimum levels;

holding each of the plurality of local maximum levels of said reproduced signal;

detecting a minimum local maximum level from the plurality of local maximum levels;

holding each of the plurality of local minimum levels of said reproduced signal;

detecting a maximum local minimum level from the plurality of local minimum levels;

detecting a maximum level of said reproduced signal;

detecting a minimum level of said reproduced signal; and calculating an evaluation value using the maximum and minimum levels of said reproduced signal and the minimum local maximum level and the maximum local minimum level of said reproduced signal.

* * * * *